Jan. 2, 1951 A. H. DICKINSON 2,536,917

COMMUTATOR

Filed March 1, 1946 2 Sheets-Sheet 1

INVENTOR
A. H. DICKINSON
BY [signature]
ATTORNEY

Jan. 2, 1951 A. H. DICKINSON 2,536,917

COMMUTATOR

Filed March 1, 1946 2 Sheets-Sheet 2

INVENTOR
A. H. DICKINSON
BY
ATTORNEY

Patented Jan. 2, 1951

2,536,917

UNITED STATES PATENT OFFICE 2,536,917

COMMUTATOR

Arthur H. Dickinson, Greenwich, Conn., assignor to International Business Machines Corporation, New York, N. Y., a corporation of New York Application March 1, 1946, Serial No. 651,181

8 Claims. (Cl. 250—27)

This invention relates to commutators or the like and particularly to those composed of electronic stages.

The general object of the invention is to provide a commutator or the like which has utmost flexibility of operation.

More specifically, an object of the invention is to provide a start-stop commutator or the like having a variable start-stop cycle.

Another object is to provide an electronic start-stop commutator or the like which may be selectively prepared to operate for selected, variable start-stop cycles.

Another object is to provide a start-stop commutator or the like which permits selection of the first stage to be operated during a cycle.

Another object is to provide a start-stop commutator or the like which permits selection of the last stage to be operated during a cycle.

Another object is to provide a start-stop commutator or the like which affords selection from among a number of stages of those to be operated during a cycle.

It is also an object of the invention to provide a start-stop commutator or the like operable selectively in different directions or sequences.

Another object is to provide a commutator or the like composed of stages some of which may be operated in one sequence and others simultaneously operated in a reverse sequence.

Still further, an object is to provide a start-stop commutator or the like having a single start-stop control element and a plurality of stages operable in different sequences during a cycle starting and ending under control of the single start-stop element.

Moreover, it is an object of the invention to provide a commutator composed of switching elements so coupled in cascade that one of them upon being switched in status is conditioned to produce a pulse for simultaneously switching a plurality of the other switching elements in status.

More specifically, an object is to provide an electrical system composed of a group of switching circuits so coupled in cascade that one of them upon being tripped in status is enabled to produce a pulse for simultaneously tripping switching circuits ahead of and behind the first-mentioned circuit.

It is also an object of the invention to provide an electronic trigger circuit which has retroactively coupled branches, with one branch so constructed as to serve, in effect, as a selective pulse gate, and with the other branch constructed to serve merely as a balancing means for the first mentioned branch.

Other objects of the invention will be pointed out in the following description and claims and illustrated in the accompanying drawings, which disclose, by way of examples, the principle of the invention and the best mode, which has been contemplated, of applying that principle.

Figure 1:
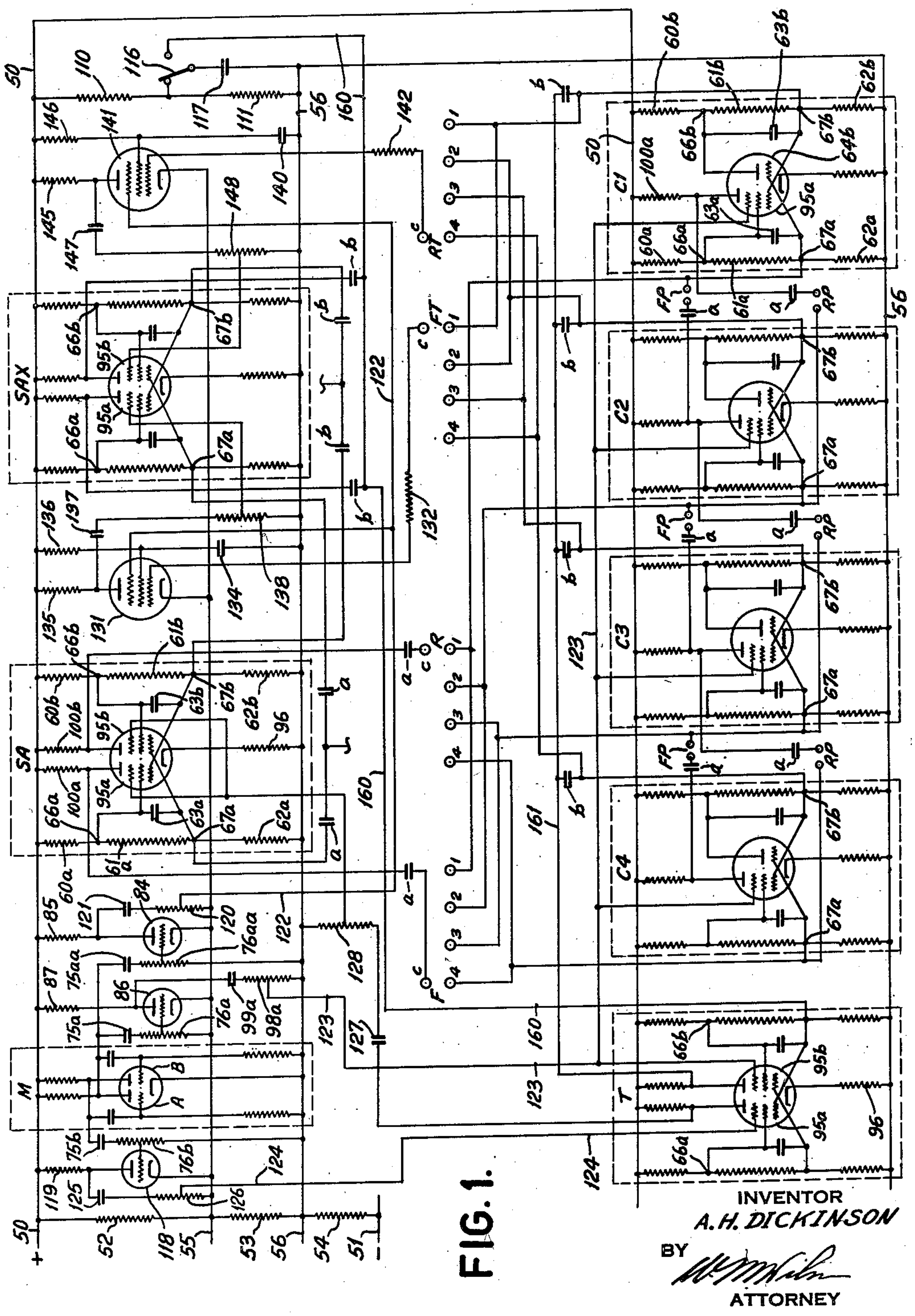
Fig. 1 is a circuit diagram illustrating the commutator and related elements.

Referring to Fig. 1, plus line 50 and minus line 51 connect via a switch (not shown) to a suitable D. C. supply. Resistors 52, 53, and 54 form a voltage divider bridging lines 50 and 51 and tapped by lines 55 and 56 at such points that line 55 is positive to line 56.

Pulses are required to control operation of the commutator. A suitable main source of pulses is an oscillator of the conventional multivibrator type. The circuit of this oscillator is shown in Fig. 1 and designated M. As is known, the oscillator develops square pulses on the outputs of its two tubes A and B, those developed by tube A being 180 degrees out of phase with those developed by tube B. The square pulses are to be differentiated into sharp, steep wave front positive and negative pulses to be selectively amplified. Specifically, the output of tube A is coupled to line 55 by a condenser 75*a* and resistor 76*a* and also coupled to line 56 by a condenser 75*aa* and resistor 76*aa*. The output of tube B is coupled to line 56 by a condenser 75*b* and resistor 76*b*. Each condenser-resistor pair has an RC product so small as to differentiate the square pulses received thereby into sharp, steep wave front positive and negative pulses.

The resistor 76*a* is tapped by the grid of a triode 86 which has its anode connected to line 50 by a resistor 87 and its cathode connected to line 55. Since the resistor 76*a* and the cathode of tube 86 both connect to line 55, the normal bias of 86 is zero, under which condition this tube is quite conductive. Accordingly, the positive pulses received from 76*a* are fairly quenched, but the negative pulses are inverted by the tube to amplified positive pulses which are transferred by a condenser 89*a* to a resistor 98*a*. The general form of the positive pulses thus produced on resistor 98*a* is indicated in Fig. 2, first line, and it is noted they are sharp, steep wave front pulses.

Resistor 76*aa* is tapped by the grid of a triode 84 which has its anode connected to line 50 by a resistor 85 and to line 55 by a condenser 121 and resistor 120. The cathode of 84 connects to line 55 which is positive to line 56 at which resistor 76*aa* terminates. Under this condition, the tube is normally at substantially cut-off bias. Accordingly, it substantially quenches the negative pulses received from resistor 76*aa* but inverts the positive pulses to amplified negative pulses which are transferred by condenser 121 to resistor 120.

Figure 2:
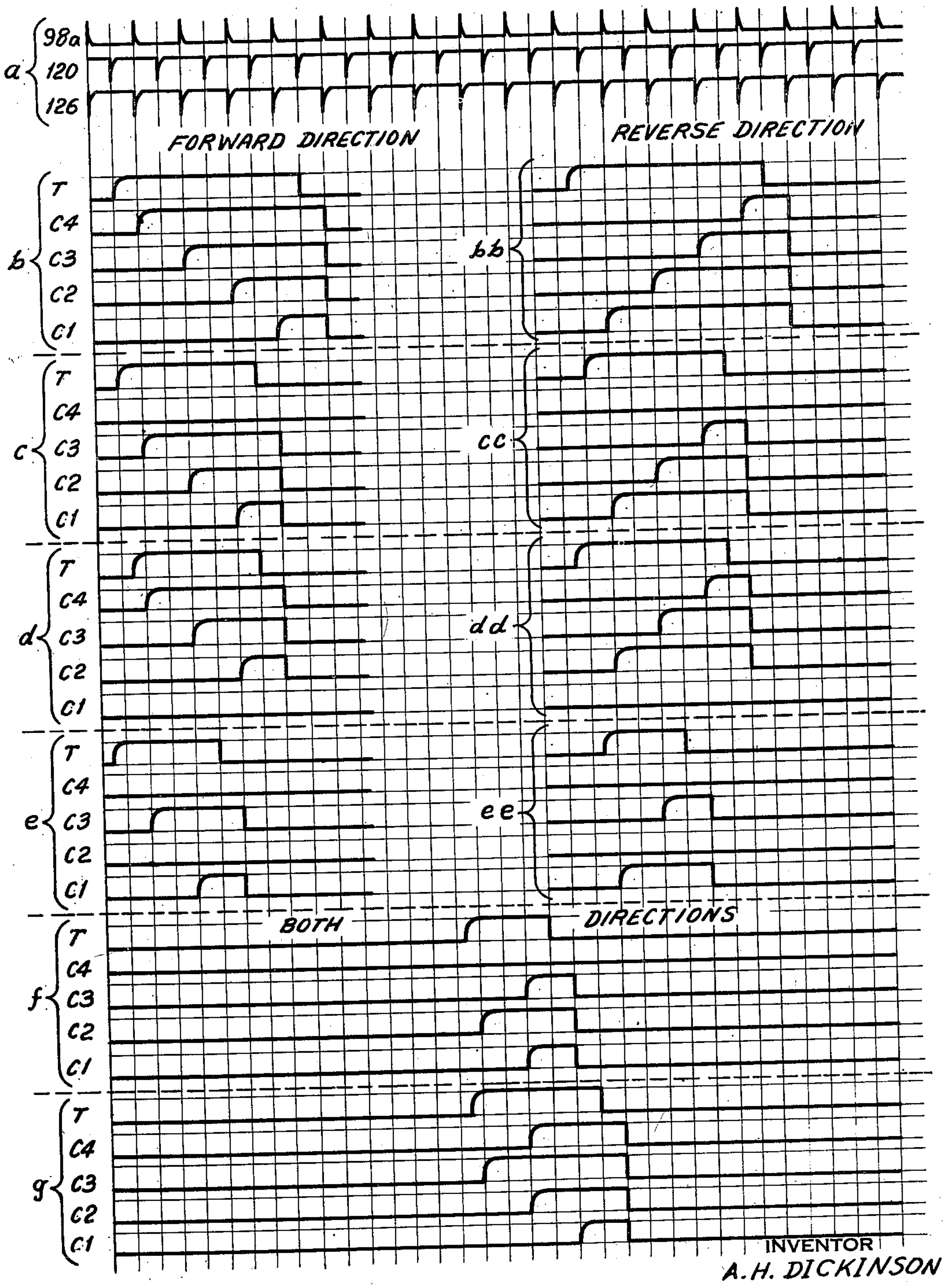
Fig. 2 is a chart showing the form of pulses utilized to operate the commutator and related elements and also indicating examples of cycles which may be performed by the commutator.

The general character and phase of the negative pulses thus produced on resistor 120 are indicated in Fig. 2, second line, and it is noted that these are sharp, steep wave front pulses, 180 degrees displaced from the positive pulses produced on resistor 98a.

Resistor 76b is tapped by the grid of a triode 118. The anode of 118 connects to line 50 via a resistor 119 and to line 55 via a condenser 125 and resistor 126. The cathode of 118 connects to line 55 which is positive with respect to line 56 at which resistor 76b terminates. Under this condition, the tube is normally at cut-off and quenches the negative pulses received from 76b. But the positive pulses received from 76b are inverted by tube 118 into amplified negative pulses which are transferred by condenser 125 to resistor 126. The general character of the pulses produced on resistor 126 is indicated in Fig. 2, third line, and it is noted that they are 180 degrees out of phase with the negative pulses produced on resistor 120.

The pulses produced on resistors 98a, 120, and 126 are utilized to control the commutator and related circuits. The commutator has a number of stages equal to the number of steps through which it is to progress during a maximum cycle. Means are provided to operate the commutator through a selectively fewer number of steps performed during a correspondingly shorter cycle. Further, means are provided to operate the commutator in either of opposite directions or, if desired, to operate it simultaneously in opposite directions.

The commutator exemplified in Fig. 1 has four stages to provide for a maximum of four steps during the maximum cycle. These stages are designated C4, C3, C2, and C1. The commutator also provides a start-stop control circuit designated T. Two circuits SA and SAX are provided to control the directions of operation of the commutator and the length of the cycle. Each of these several circuits is an electronic trigger circuit which has alternative states of stability. Circuits SA, SAX, and T are like trigger circuits of the kind disclosed in my copending application Serial No. 651,180, filed March 1, 1946 now Patent No. 2,517,986 dated August 8, 1950. Circuits C4, C3, C2, and C1 are alike and resemble the other trigger circuits in some respects but differ from them in other respects. To aid in identifying the similarities among the various circuits, corresponding parts of all circuits will be given the same reference characters.

The trigger circuit of the kind used for SA, SAX, and T will be described first. This trigger circuit may be referred to as the type 1 trigger circuit to distinguish it from the other trigger circuit which may be called the type 2 trigger circuit. The construction of the type 1 trigger circuit will be explained with particular reference to circuit SA to which a full set of reference characters has been applied in Fig. 1.

The type 1 trigger circuit has two parallel and symmetrical impedance networks or branches. The left hand branch includes resistors 60a, 61a, and 62a, in series between lines 50 and 56, and a condenser 63a shunting resistor 61a. The right hand branch includes a similar arrangement of resistors 60b, 61b, and 62b and condenser 63b. A pair of pentodes 95a and 95b are connected, with their anode-cathode circuit paths in parallel, between lines 50 and 56. Simply for convenience, the pentodes are shown as sections of a duplex tube having a common cathode. The anodes of 95a and 95b connect via resistors 100a and 100b, respectively, to line 50, and the common cathode connects to line 56 through a resistor 96. It may be mentioned now that the resistor 96 is of such value that when either 95a or 95b is conductive, the potential drop across the resistor 96 is substantially equal to the maximum potential drop which may exist across either resistor 62a or 62b. The screen grid (hereinafter called screen) of 95a is connected to the junction 66a of resistors 60a and 61a, while the screen of 95b is connected to the junction 66b of resistors 60b and 61b. The control grid (hereinafter called grid) of 95a is connected to the junction 67b of resistors 61b and 62b, while the grid of 95b is connected to junction point 67a of resistors 61a and 62a.

The similarly numbered parts of the two branches of each trigger circuit have equal values. In practice, it has been found desirable to use resistors 60a, 62a, 60b, and 62b, each of which has about one-third the resistance of each of the resistors 61a and 61b. Condensers 63a and 63b each have a capacity in the order of a few micro-microfarads.

It will be noted that the screen-cathode path of the pentode 95a is in shunt with the resistors 61a and 62a and, therefore, may be considered as a portion of the left hand impedance branch of the trigger circuit. Similarly, the screen-cathode path of 95b may be considered a portion of the right hand impedance branch. It will be noted, further, that the two impedance branches of the trigger circuit are cross-coupled since point 67a of the left hand branch connects to the grid of tube 95b while point 67b of the right hand branch is connected to the grid of tube 95a.

The trigger circuit described above has two alternative states of stability. In one state, which may be called the off state, pentode 95b is at substantially zero grid bias and has large screen-cathode current flow while the grid bias of pentode 95a is negative and its screen-cathode path is at cut-off. Also, in the off state, points 66a and 66b are at high potentials while points 67a and and 67b are at low potentials. In the alternative state, which may be called the on state, the electrical conditions are reversed. The circuit is self-sustaining in either of its two alternative states until it is driven to the reverse state by a tripping pulse.

In the off state of the trigger circuit, the grid of tube 95b is substantially at zero bias, under which condition there is large current flow through the screen-cathode path of 95b. With the resistor 60b properly chosen, the impedance of this screen-cathode path is then low compared to that of the resistor. Accordingly, the screen of 95b is not much higher in potential than the cathode, and the point 66b, to which the screen is connected, is at like low potential. With resistors 61b and 62b correctly chosen, the potential drop across 61b forces the potential of point 67b substantially below cathode potential. Since the grid of 95a is connected to point 67b, it is also negative with respect to the cathode and sufficiently so to block screen-cathode current in 95a. In other words, the screen-cathode path of 95a is at cut-off, and its impedance is high compared to that of resistor 60a. Hence, the screen of 95a and the point 66a connected to this screen are at high potential such that the potential drop across resistor 61a does not force point 67a below cathode potential. As the grid of 95b is connected to point 67a, the grid bias of 95b is then substantially zero, thus maintaining the screen-cathode path of 95b at low impedance.

In the foregoing manner, the trigger circuit when in off state has a distribution of potential such as to sustain the circuit in this state. Similarly, since the branches are symmetrical, the circuit is self-sustaining in its on state in which pentode 95a is at substantially zero grid bias and has large screen-cathode current flow, and in which points 66a and 67a are at low potentials, while pentode 95b is at negative grid bias, its screen-cathode path is at cut-off, and points 66b and 67b are at high potentials.

The trigger circuit may be reversed in status in response to a tripping pulse applied to a suitable point. Thus, it is reversible from off to on state either in response to a negative pulse applied to point 67a or a positive pulse applied to point 67b. It is reversible from on to off state in reponse to a negative pulse applied to point 67b or a positive pulse applied to point 67a. Assume, for instance, that the trigger circuit SA is in off status and a negative pulse is applied via a condenser to point 67a. This pulse reduces the potential difference across resistor 62a. In other words, the potential of point 67a, and the connected grid of 95b, drops from its previous approximate cathode level to a negative value with respect to the cathode. Consequently, current flow through the screen-cathode path of 95b decreases, there is a diminished voltage drop across resistor 60b, and point 66b suddenly rises in potential. The positive pulse thereby produced at point 66b is transferred by condenser 63b to the grid of 95a, effecting a sudden lowering of its previously negative grid bias. Accordingly, the current flow in the screen-cathode path of 95a increases, there is a larger voltage drop across the resistor 60a, and point 66a decreases suddenly in potential. The negative pulse thereby produced at point 66a is transferred by condenser 63a to the grid of 95b, promoting its increase in negative bias and the consequent reduction in its screen-cathode current flow. The interaction between the two branches of the trigger circuit continues until ultimately the screen-cathode path of 95b is at cut-off while that of 95a has large current flow. In short, the trigger circuit has been tripped from off to on state in which points 66a and 67a are at low potentials and points 66b and 67b at high potentials and in which pentode 95a is at substantially zero grid bias and its screen-cathode path is at low impedance, while 95b is at negative grid bias and its screen-cathode path is at cut-off. In a similar manner, the trigger circuit may be switched from the on state to the off state in response to a negative pulse applied to point 67b.

Instead of tripping the trigger circuit by a negative pulse applied to point 67a or 67b, it may be tripped by a positive pulse applied to such point. It is evident that the positive pulse will have the opposite effect of a negative pulse applied to the same point. Thus, a positive pulse applied to point 67b will reverse the trigger circuit from off to on state while a negative pulse applied to point 67b will be effective to reverse the circuit from on to off state. Assume, for instance, that a positive pulse is applied to point 67b while the circuit is in off state. Such pulse increases the potential difference across resistor 62b; that is, the potential at point 67b rises, so that the negative grid bias of tube 95a is reduced. Accordingly, current starts to flow in the screen-cathode path of 95a, with a consequent sudden drop in potential of point 66a. The negative pulse thereby produced at point 66a is transferred by condenser 63a to the grid of 95b, whereby the screen-cathode impedance of 95b is increased. Thereupon, point 66b rises in potential and a positive pulse is transferred via condenser 63b to the grid of 95a, promoting the decrease in the negative grid bias which was initiated by the positive pulse applied to point 67a. In a manner now understood, the interactions between the branches of the circuit continues so as to bring the circuit to its stable on state. Similarly, the circuit may be tripped from on to off state by a positive pulse impressed on its point 67a.

It should be noted that in order to effect good tripping action, the tripping pulses should be steep and shorter in duration than the pulses passed through condensers 63a and 63b in the course of the tripping action.

It is a fact with respect to a pentode that if its suppressor is sufficiently negative with respect to the cathode, it blocks anode-cathode current flow regardless of the grid potential, and if the suppressor is raised in potential substantially to cathode potential, then current flow in the anode-cathode path depends on the grid bias. If the grid bias is at cut-off, an increase in suppressor potential will have no effect and the anode-cathode path of the pentode will remain at cut-off, but if the grid bias is substantially zero and the suppressor is brought to about cathode potential, there will be current flow in the anode-cathode path of the pentode. If the suppressor bias is normally negative, the pentode when at zero grid bias will have no anode-cathode current flow until the suppressor bias is reduced to substantially zero. Thus, a positive pulse applied to the suppressor of the pentode at zero grid bias will produce a pulse of current flow in the anode-cathode path and a negative pulse will appear upon the anode. On the other hand, if the suppressor bias is normally zero in the pentode at zero grid bias, there will be continuous current flow in the anode-cathode path until a negative pulse is applied to the suppressor to increase its bias to cut-off. Thereupon, current flow in the anode-cathode path abruptly ceases and a positive pulse appears on the anode of the pentode.

In the on state of the trigger circuit, only the pentode 95a is conditioned by zero grid bias to respond to variations in potential of the suppressor. Thus, if the suppressor bias is normally zero, 95a will invert negative pulses upon its suppressor to positive pulses upon its anode. But if the suppressor bias is normally at cut-off, 95a will invert positive pulses upon its suppressor to negative pulses upon its anode. In the off state of the trigger circuit, it is the pentode 95b which is conditioned to function in the foregoing manner.

The type 1 trigger circuit, exemplified by SA, SAX, and T has been described. The type 2 trigger circuit exemplified by the commutator stages C4, C3, C2, and C1 will now be explained.

The type 2 trigger circuit has features in common with the type 1 trigger circuit. Briefly, the left hand branch of the type 2 trigger circuit is the same in construction as the left hand branch of the type 1 circuit. The right hand branch of the type 2 circuit uses a triode 64b in place of the pentode 95b of the type 1 trigger circuit. The anode of 64b is connected to point 66b; hence, the anode-cathode path of 64b serves as a portion of the impedance of the right hand branch. It will be noted that the tube 64b will not serve as a gate for pulses. Thus, the type 2 trigger circuit provides only one possible gate, pentode 95a for pulses and this gate will be open when the trigger circuit is in on status. The right hand branch of this trigger circuit acts merely to balance the left hand branch. The manner in which this type of trigger circuit is triggerable to self-sustained, alternative off and on states is similar to the manner in which the type 1 trigger circuit is triggered, and need not be explained in detail. It is understood, now, that a negative pulse applied to point 67a of the type 2 trigger circuit is capable of tripping it from off to on status while a negative pulse applied to point 67b is capable of tripping it from on to off status.

The commutator may be operated in a forward direction or a reverse direction or simultaneously in both directions during a cycle. Further, the cycle may be varied in size; i. e., composed of a variable number of steps. In other words, the number of stages operated during a cycle may be varied. Still further, the cycle may start with any of the stages and stop with any of the stages; i. e., the last and first stages to be operated during a cycle may be selectively determined. If simultaneous operation in both directions is to be effected during a cycle, the first and last stages to be operated in each direction may be selectively chosen. To afford such flexibility in operation of the commutator, several sets of plug sockets are provided. The set of sockets F is plugged according to which of the stages is to be the first operated stage in a forward direction. Thus, if Fc is plugged to F3, the stage C3 will be the first one operated in the forward direction. Sockets R are plugged to choose the first stage to be operated in the reverse direction. Sockets FT are plugged according to which stage is to be the last one operated in the forward direction. Sockets RT similarly determine which stage is to be the last one operated in the reverse direction. There are sockets FP between each pair of adjacent stages which are plugged together when the stage at the left (as viewed in Fig. 1) is to control the stage at the right. Other sockets RP between adjacent stages are plugged together when the stage at the right is to control the stage at the left. For reference purposes, the forward direction is the one in which the stages operate sequentially from left to right (as viewed in Fig. 1), and the reverse direction is the one in which stages operate from right to left in succession. For example, the forward sequence in a maximum length cycle of four steps of the illustrated commutator embraces the successive operation of stages C4, C3, C2, and C1.

As explained above, sockets FT or RT are plugged according to which of the stages is to be the last operated one in the forward or reverse direction. The socket FTc is connected by a resistor 132 to the grid of a pentode 131 and the socket RTc by a resistor 142 to the grid of a pentode 141. The anodes of 131 and 141 are connected to line 50 by resistors 135 and 145, respectively. Their cathodes connect to line 55. Their screen grids are maintained at constant potential, the screen of 131 being connected to the line 50 by a resistor 136 and to line 56 by a condenser 134, and the screen of 141 being connected to line 50 by similar resistor 146 and condenser 140. The suppressors of 131 and 141 are tied to a common wire 122 which taps the resistor 120 on which negative pulses (Fig. 2, line 2) are continually produced, as already described. Since resistor 120 and the cathodes of 131 and 141 connect to line 55, the suppressor bias of 131 and 141 is normally zero. Hence, normally, anode-cathode current will flow in 131 and 141 when their control grid bias is zero, but upon the transmission of a negative pulse from resistor 120 to the suppressor of the pentode 131 or 141 at zero grid bias, current flow will be interrupted and a positive pulse will be developed by the pentode upon its anode. The control grid of 131 is adapted to be plugged via socket FTc and a selected one of the sockets FT4, 3, 2, and 1 to the point 67b of the similarly numbered commutator stage. When a stage is in off status, its point 67b is below cathode potential and, hence, the control grid, of 131, which has been plugged to the stage is then at negative bias, blocking anode-cathode current flow regardless of the suppressor potential. But if the plugged-in stage is in on status, its point 67b is at substantially cathode potential; as is the control grid of 131. The pentode 131 is then in condition to invert a negative pulse upon its suppressor to a positive pulse upon its anode. Similarly, if the control grid of the pentode 141 has been plugged, via sockets RT to point 67b of a stage, this pentode will be conditioned by the stage, when in on status, to develop a positive pulse in response to a negative pulse on its suppressor.

The several possible operations of the commutator will now be described.

Assume that the commutator is to be operated in the forward direction through its maximum of four steps. To prepare for this type of operation, socket Fc is plugged to socket F4, socket FT is plugged to socket FT1, and each pair of sockets FP is connected by a plugwire (not shown). Further, both circuits SA and SAX are tripped on under control of pulses applied to the circuits simultaneously from a suitable source (not shown). Assuming a negative pulse is to be used as the tripping pulse for circuits SA and SAX, such pulse is applied from the source (not shown) via condensers a to points 67a of both circuits, turning them on. The pentodes 95a in SA and SAX are now conditioned to develop negative pulses in response to positive pulses applied to their suppressors.

To start a commutator cycle, the start-stop control circuit T is switched to on state by a positive pulse applied to its point 67b. The positive pulse is supplied by a condenser 117. The condenser is connected at one side to the line 56 and at the opposite side to the blade of a hand switch 116. One terminal of switch 116 connects to the junction of a pair of resistors 110 and 111 across lines 50 and 51. The other terminal of switch 116 connects to a wire 160 which leads to point 67b of circuit T. Prior to placing the commutator in operation, the switch 116 is in the position shown, whereby condenser 117 is charged to the potential across resistor 111. To initiate commutator operation, the operator reverses switch 116, connecting condenser 117 to wire 160. The condenser thereupon discharges a sharp positive pulse upon the wire 160 which transmits the pulse to point 67b of circuit T, turning it on. This action occurs at the chance time chosen by the operator to reverse the switch 116. With T now on, its pentode 95a is conditioned by zero grid bias to respond to variations in its suppressor potential. The suppressor of 95a (T) is connected by a wire 124 to an intermediate point of resistor 126. The resistor 126 terminates at line 55 which has a potential substantially equal to the cathode potential of the tubes in the trigger circuits. Accordingly, the normal suppressor bias of 95a (T) is substantially zero and since it is now also at zero control grid bias, current flows in its anode cathode path. As explained before, negative pulses (see Fig. 2, line 3) are continually produced on resistor 126. The first negative pulse transmitted from resistor 126 by wire 124 to the suppressor of 95*a* (T) after T has been turned on is therefore inverted by 95*a* to a positive pulse upon its anode. This positive pulse is transmitted via a condenser 127 and resistor 128 to the suppressors of 95*a* and 95*b* of SA. Since SA is on, its pentode 95*a* is at zero grid bias and inverts the positive pulse upon its suppressor to a negative pulse upon its anode. This negative pulse is transmitted via a condenser *a* to plug socket F*c*, thence by plugwire (not shown) to chosen socket F4, and from there to point 67*a* of the commutator stage C4. As explained before, a negative pulse applied to the point 67*a* of a trigger circuit turns it on; hence C4 is turned on by the negative pulse received from the output of 95*a* of SA. Reference to Fig. 2, part *b*, shows that after T has been tripped on, the following negative pulse upon the resistor 126 brings about the chain of operations, described above, to cause the stage C4 to be turned on, such action being indicated in Fig. 2 by the rise in potential of the point 66*b* of the stage.

The suppressors of the pentodes 95*a* of all the stages are tied to a common wire 123 which taps the resistor 98*a*. Since 98*a* terminates at line 56 which is substantially below cathode potential of the pentodes 95*a*, the suppressor bias of these pentodes in the stages is normally at cut-off. Positive pulses (see Fig. 2, line 2) are continually produced on resistor 98*a*, as previously explained. These positive pulses are transmitted concurrently to the suppressors of pentode 95*a* of the stages but only the pentode of the stage in on status is conditioned to respond to the pulse. Hence, after C4 has been turned on, the following positive pulse, from resistor 98*a*, upon the suppressor of its pentode 95*a* is inverted to a negative pulse upon its anode. This negative pulse is transmitted via the plugged sockets FP between C4 and C3 to point 67*a* of C3, turning it on. Thus, the first positive pulse received from resistor 98*a* by C4 after turning on is effective to cause C3 to be turned on, as indicated in Fig. 2, part *b*. Similarly, with C3 on, it responds to the next pulse from 98*a* to switch C2 on, and then C2, in turn, responds to a following such pulse to switch C1 on. Thus, C4, C3, C2, and C1 are turned on sequentially, in the forward direction, at intervals of the pulses on resistors 126 and 98*a*.

The point 67*b* of C1 has been connected through plugging including FT*c* and FT1 to the control grid of pentode 131. With C1 now on, its point 67*b* and the control grid of 131 are at cathode potential. Accordingly, 131 develops a positive pulse upon its anode in response to the first negative pulse received by its suppressor from resistor 120 after C1 has been switched on. This positive pulse is transferred by a condenser 137 to a resistor 138 which terminates at line 56. Resistor 138 is tapped by a wire leading to the suppressor of 95*a* of SAX. Since resistor 138 terminates at line 56, which is negative to the cathode of 95*a* (SAX), the normal suppressor bias of 95*a* (SAX) is sufficiently negative to block anode-cathode circuit flow even when its control grid bias is zero. But the positive pulse received by the suppressor of 95*a* (SAX) from resistor 138 increases its potential above the critical value. Since SAX is in on status, 95*a* is also at zero control grid bias; hence, it is effective to invert the positive pulse upon its suppressor to a negative pulse upon its anode. This negative pulse is fed via a condenser *b* and the wire 160 to point 67*b* of start-stop control circuit T, thereby switching T to off state. It may be noted from Fig. 2 that the first negative pulse received by tube 131 after C1 has been turned on brings about the off-switching of circuit T.

With T now in off state, its pentode 95*b* is conditioned to respond to a pulse on its suppressor. The suppressor of 95*b* (T) is connected to wire 123 which is receiving positive pulses from the resistor 98*a*. The positive pulses transmitted to the suppressor of tube 95*b* of T, now in off state, are inverted by the tube to negative pulses upon the anode. These negative pulses are transmitted to a wire 161 which is connected by parallel condensers *b* to points 67*b* of all the commutator stages. Hence, the first negative pulse produced by T after it has been turned off is effective, upon its application to the points 67*b* of the stages, to turn them off concurrently, terminating the cycle (see Fig. 2, part *b*). Such negative pulses continue to be produced by T and tend to affirm the off states of the stages until T is again turned on. This can be done only by bringing the switch 116 back to the shown position and allowing condenser 117 to be re-charged, and then reversing the position of the switch again.

The maximum length cycle in the forward direction has been explained. SA and SAX were both on. Operation was initiated by turning on T. A negative pulse from resistor 126 was then inverted by T to a positive pulse which was transmitted to SA. In response to the positive pulse, SA produced a negative pulse which was transmitted through a connection including a plugwire between Fc and F4 to point 67*b* of C4, turning it on. It is clear that if Fc were plugged to F3, the negative pulse from SA would be transmitted to point 67*b* of C3. The commutator cycle proper would thus start with the tripping on of C3 and C4 would remain idle, as indicated in Fig. 2, part *c*. If Fc were plugged to F2, the negative pulse from SA would be transmitted to point 67*b* of C2, turning it on, after which C1 would be switched on. C4 and C3 would remain idle. If Fc were plugged to F1, only C1 would be turned on and C4, C3, and C1 would remain idle.

After the first chosen stage was turned on, it brought about the sequential turning on of the following stages in the forward direction. The last stage to be turned on is determined by the plugging between FTc and the chosen socket FT4, 3, 2, or 1. If FTc is plugged to FT1, C1 is the last-operated stage, as in the 4-step cycle (Fig. 2, part *b*) and the 3-step cycle indicated in Fig. 2, part *c*. If FTc were plugged to FT2 and F plugged to F4, then the 3-step cycle indicated in Fig. 2, part *d* would be performed. If FTc were plugged to FT1 and F to F2, a 2-step cycle of C2 and C1 would be performed. Likewise, by proper plugging, a 2-step cycle of C4 and C3 or C2 or C1, or of C3 and C2 or C1 may be effected. Fig. 2, part *e* indicates, as an example, a 2-step cycle of C3 and C1. The plugging for this is from Fc to F3, from FTc to FT1, and from the FP socket associated with C3 to the socket FP associated with C1. If FTc and Fc were plugged to the same-numbered sockets FT and F, a 1-step cycle would be performed. Thus, a 1-step cycle of C4, C3, C2, or C1 may be effected.

It will be noted that the stages will be in on state during such cycles for different increments of time depending on the plugging. Operations in the forward direction for various extents and of various stages have been described above. The operations in the reverse direction will now be explained. For this type of operation, SA and SAX are tripped off, as by a negative pulse from a suitable source (not shown) applied via a pair of *b* condensers to points 67*b* of SA and SAX. Further, the plugwires between sockets F and between sockets FT, and also between the sockets FP of each pair, are removed. Instead, plugwires are connected between the sockets RP of each pair, a plugwire is connected between socket R*c* and a selected one of the sockets R1, 2, 3, and 4, and a plugwire is connected between socket RT*c* and a chosen one of the sockets RT4, 3, 2, and 1.

The operation of the commutator is again initiated by reversing switch 116, whereby a positive pulse is discharged by condenser 117 upon point 67*a* of T, turning it on. As before, 95*a* (T) then inverts a negative pulse from resistor 126 to a positive pulse which is transmitted by condenser 127 to resistor 128 and thence to the suppressors of both pentodes 95*a* and 95*b* of SA. Since SA now is off, only 95*b* (SA) is conditioned to invert the positive pulse on its suppressor to a negative pulse. This negative pulse is fed via a condenser *a* to socket R*c* and thence by plugwire (not shown) to the chosen one of the sockets R1, 2, 3 and 4. From the chosen, numbered R socket, the negative pulse is fed to point 67*a* of the correspondingly numbered commutator stage, turning on this stage. The on stage is then conditioned to invert a positive pulse from resistor 98*a* (and wire 123) to a negative pulse. The negative pulse is fed via the plugwire (not shown) between the RP sockets intermediate the on stage and the next stage in the reverse direction (to the left of the on stage), turning on such next stage. For example, if R*c* is plugged to R1, the stage C1 is turned on first and develops a negative pulse, in response to a positive pulse from wire 123. The negative pulse is transmitted, via a plugwire between the sockets RP to the left of stage C1, to the point 67*a* of stage C2, turning it on. Similarly, C2 may develop a negative pulse which results in the turning on of C3, and C3 may then develop a negative pulse for turning on C4.

The reverse cycle may terminate under control of any of the chosen stages. For instance, if C4 is the last stage to be turned on in the reverse direction, then socket RT*c* is plugged to socket RT4. Hence, when C4 goes on, the increased potential of its point 67*b* is transferred via the plugged sockets RT4 and RT*c* and the resistor 142 to the control grid of pentode 141. This pentode then is effective to invert a negative pulse, transmitted to its suppressor from resistor 120 by wire 122, to a positive pulse. The positive pulse is fed via a condenser 147 to the resistor 148 and thence to the suppressor of 95*b* of SAX. Since SAX is off, 95*b* is in condition to invert the positive pulse on its suppressor to a negative pulse. This negative pulse is communicated by a condenser *b* and wire 160 to the point 67*b* of T, turning it off. As before, the circuit T again in off state causes all the on stages to be turned off. It will be clear that if C3 were the last stage to be turned on in its reverse direction, then socket RT*c* would be plugged to socket RT3, and if C2 were the last one chosen for operation, socket RT*c* would be plugged to socket RT2. If C1 were chosen as the first and last stage to operate in the reverse direction, then RT*c* would be plugged to RT1 and R*c* to R1. It is evident that the stage plugged to socket RT*c* will be effective, upon being turned on, to condition pentode 141 to develop the positive pulse which is inverted by SAX to the negative pulse for turning off T, as a result of which the cycle terminates. Fig. 2, parts *bb*, *cc*, *dd*, and *ee* show different cycles which may be performed in the reverse direction and match the parts *b* to *e* of Fig. 2 which indicate similar cycles in the forward direction.

Operations of the commutator through varying cycles in either forward or reverse direction have been described. The arrangement also provides for operation in both directions of stages of the commutator during a cycle. Assume, for example, that the stage C2 is to operate and then the stages C1 and C3 are to operate simultaneously. To prepare for this mode of operation, control circuits SA and SAX are tripped on, a plugwire is connected between sockets F*c* and F2, the socket FT*c* is plugged either to FT1 or RT3, the sockets FP between C2 and C1 are connected by a plugwire, and the sockets RP between C2 and C3 are similarly connected.

Operation is initiated, as before, by reversing switch 116 to enable condenser 117 to emit a positive pulse for turning on start-stop control circuit T. A negative pulse from resistor 126 (and line 124) is inverted by T to a positive pulse which is transferred by condenser 127 and a portion of resistor 128 to the suppressor of 95*a* of SA. Since SA is on, its pentode 95*a* is effective to invert the positive pulse to a negative pulse which is applied via condenser *a* and the plugwire (not shown) between sockets F*c* and F2 to point 67*a* of C2, turning it on (see Fig. 2, part *f*). C2 is then effective to invert a positive pulse from resistor 98*a* (and line 123) to a negative pulse. This negative pulse is transmitted via the plugged sockets FP between C2 and C1 and also via the plugged sockets RP between C2 and C1 simultaneously to C1 and C3, turning them both on (see Fig. 2, part *f*). If RT3 has been plugged to FT*c*, then the rise in potential of point 67*b* of C3 will be transferred to the control of pentode 131, but if FT1 has been plugged to FT*c*, the rise in potential of point 67*b* of C1 will be transferred to the control grid of 131. In either case, pentode 131 is conditioned to invert a negative pulse from resistor 120 (and line 122) to a positive pulse. This pulse is transferred by condenser 137 and a portion of resistor 138 to the suppressor of 95*a* of SAX. Since SAX is on, its pentode 95*a* is effective to invert the positive pulse to a negative pulse. The negative pulse is fed via condenser *b* and wire 160 to point 67*b* of T, turning it off. With T off, it is effective to invert a positive pulse from resistor 98*a* to a negative pulse which is applied via parallel condensers *b* to points 67*b* of all the stages, turning off the on stages C2, C1 and C3 (see Fig. 2, part *f*).

It will be appreciated that a similar mode of operation may be effected with respect to stages C3, C2 and C4; C3 will be turned on first and then will cause simultaneous tripping of C2 and C4 to on state. It will also be appreciated that another mode of operation may be carried out during a cycle, in which stage C2 may be turned on followed by the simultaneous turning on of C1 and C3 and then the turning on of C4. Likewise stage C3 may be operated followed by operation of C4 (in the reverse direction) and C2 and C1 in the forward direction.

Assume, for instance, that C4 is to operate after

C3, in the reverse direction, and C2 and C1 are to operate after C3 in the forward direction during the same cycle. For this mode of operation, SA and SAX are left in on state, a plug connection is made between Fc and F3, another plug connection is made between FT1 and FTc, the sockets RP between C3 and C4 are connected by a plugwire, the pair of sockets FP between C3 and C2 is connected, and also the pair of sockets FP between C2 and C1 is connected. The circuit T is turned on as before. It then inverts a negative pulse from resistor 126 to a positive pulse which is transferred, as previously described, to SA. A resulting negative pulse is emitted by SA through the path including the plugged sockets Fc and F3 to point 67*a* of C3, turning it on (see Fig. 2, part *g*). C3 then is effective, in response to a positive pulse from resistor 98*a*, to produce a negative pulse which is applied via the plugged sockets RP between C3 and C4 to point 67*a* of C4, turning it on. The negative pulse emitted by C3 is simultaneously applied via the plugged sockets FP between C3 and C2 to point 67*a* of C2, turning it on (Fig. 2, part *g*). C2 is now effective to invert a positive pulse from resistor 98*a* to a negative pulse which is transmitted via the plugged socks FP between C2 and C1 to point 67*a* of C1, turning it on. Since point 67*b* of C1 has been connected to the grid of tube 131 by the plugging between sockets FT1 and FT*c*, the turning on of C1 initiates the operations, previously explained, for terminating the cycle.

A third mode of operation may be effected during which C3 and C4 will operate in the reverse direction and C2 and C1 in the forward direction. For this mode of operation, SA and SAX may be left on, the socket F*c* may be connected by a double plugwire to sockets F2 and R3 and socket FT*c* may be connected by a plugwire either to socket FT1 or RT4. Further, the sockets FP between C2 and C1 will be plugged together, and also the sockets RP between C3 and C4 will be plugged together. Operation will be initiated as before, whereby a negative pulse produced by SA will be applied via sockets F and F2 to point 67*a* of C2 and via sockets F and R3 to point 67*a* of C3. C2 and C3 will turn on simultaneously. C2 will then cause C1 to turn on and C3 will cause C4 to turn on at the same time. Assuming FT1 is plugged to FT*c*, the on switching of C1 will cause the cycle to terminate.

Attention is called to the fact that the two parallel sets of sockets F1 to F4 and R1 to R4 and also the two parallel sets of sockets FT1 to 4 and RT1 to 4 are provided to aid the operator in making the correct plug connections for the desired types of operation. If not for this consideration, one of the sets of sockets in each parallel pair of sets could be omitted. For instance, sockets R1 to 4 and RT1 to 4 may be omitted. Sockets F1 to 4 may then be plugged either to F*c* or R*c* and sockets FT1 to 4 may be plugged either to FT*c* or RT*c*. It will also be appreciated that other means than the trigger circuits SA and SAX may be utilized to produce the negative pulses at the proper times for turning on the first chosen stage or stages and for controlling the termination of the cycle.

While there have been shown and described and pointed out the fundamental novel features of the invention, as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An electrical system comprising a plurality of electronic trigger stages, each having alternative on and off states between which it may be tripped by the application thereto of tripping voltage pulses, means so coupling the stages that each stage upon being tripped on controls the application of a tripping pulse to a next stage for on-tripping, whereby the stages may be sequentially tripped to on state, pulsing means acting through the stages for producing such sequential on-tripping of the stages, means coupled to all of the stages and controlled by a last stage upon its being tripped on for applying pulses to the stages to trip off concurrently the sequentially tripped-on stages, and selective coupling between the last mentioned means and one or another of the stages, so as to select the last stage to be tripped on.

2. An electrical system comprising a plurality of electronic trigger devices, each having alternative on and off states between which it may be tripped by the application thereto of tripping voltage pulses, pulsing means for applying tripping pulses to said devices, means so coupling the devices that each upon being tripped on controls the application of a tripping pulse to a next device to be tripped on, whereby a sequence of on states may be produced in a succession of the devices, starting means to start the sequence by controlling the application of a tripping pulse to a first device to trip it on, and, means selectively coupling one or another of the devices to the starting means to serve as the first device.

3. An electrical system comprising a plurality of pulse gates, each having an open condition to pass an applied pulse and an alternative, closed condition in which it is ineffective to pass a pulse, coupling means for the pulse gates reacting to a pulse passed by each gate, when open, to produce the open condition of a next gate until a last gate has been opened, and circuit means connected to all of said gates and reacting to the pulse passed by this last open gate for concurrently closing all the gates.

4. An electrical system such as defined in claim 3, said coupling means including selective connections for variably coupling the gates to be sequentially opened in one sequential order or in a different sequential order.

5. An electrical system comprising a plurality of electronic trigger circuits having alternative on and off states, each circuit embracing a pulse gate comprising a space current path open in the on state of the circuit to pass an applied pulse and closed in the off state to block an applied pulse, means coupling the circuits so as to transmit the effect of a pulse passed by the gate, when open, of a first circuit in on state to a next circuit to trip this next circuit to on state and open its gate to enable a similar effect to be produced on another of the circuits, and pulsing means connected to all of said trigger circuits and reacting to a pulse passed by the open gate of a last circuit tripped on for pulsing all the on-tripped circuits to trip them to off state concurrently.

6. A start-stop commutator comprising a plurality of switchable stages having alternative on and off states, means for operating the stages sequentially to on state during a forward or reverse cycle, direction selecting means for selecting either a forward or reverse cycle to be performed, a start-stop control element coacting with the direction selecting means to start either a forward or reverse cycle, and means controlled by the last stage turned on during either a forward or reverse cycle for operating through the direction control means and said element to concurrently turn off all the stages so as to terminate either the forward or reverse cycle.

7. A start-stop commutator comprising a series of switchable stages having alternative on and off states, means so coupling the stages that some of them may be turned on sequentially in one direction along the series and others may be turned on sequentially in a reverse direction along the series during the same start-stop cycle, means including said coupling means for bringing about the on-turning of the stages, some of them sequentially in one direction and others of them sequentially in the reverse direction according to their coupling, and control means coupled to all of the stages and controlled by the turning on of a selected one of the stages for concurrently turning off all the stages to terminate the cycle.

8. An electrical system comprising a plurality of electronic trigger devices, each having alternative on and off states between which it may be tripped by the application thereto of tripping voltage pulses, pulsing means for applying tripping pulses to said devices, means so coupling the devices that each upon being tripped on controls the application of a tripping pulse to a next device to be tripped on, whereby a sequence of on states may be produced in a succession of the devices, starting means to start the sequence by controlling the application of a tripping pulse to a first device to trip it on, means selectively coupling one or another of the devices to the starting means to serve as the first device, and means coupled to all of the stages and controlled by a last stage upon its being tripped on for applying pulses to the stages to trip off concurrently the sequentially tripped-on stages, and selective coupling between the last mentioned means and one or another of the stages, so as to select the last stage to be tripped on.

ARTHUR H. DICKINSON.

REFERENCES CITED

The following references are of record in the file of this patent:

UNITED STATES PATENTS

| Number | Name | Date |
|---|---|---|
| 2,008,909 | Hershey | July 23, 1935 |
| 2,158,285 | Koch | May 16, 1939 |
| 2,281,396 | Vibbard | Apr. 28, 1942 |
| 2,302,535 | Durbin | Nov. 17, 1942 |
| 2,303,016 | Blount | Nov. 24, 1942 |
| 2,369,662 | Deloraine et al. | Feb. 20, 1945 |
| 2,384,792 | Brown | Sept. 18, 1945 |
| 2,402,372 | Compton et al. | June 18, 1946 |
| 2,417,831 | Kinkead | Mar. 24, 1947 |
| 2,435,840 | Morton | Feb. 10, 1948 |
| 2,442,428 | Mumma | June 1, 1948 |